Figure 1:
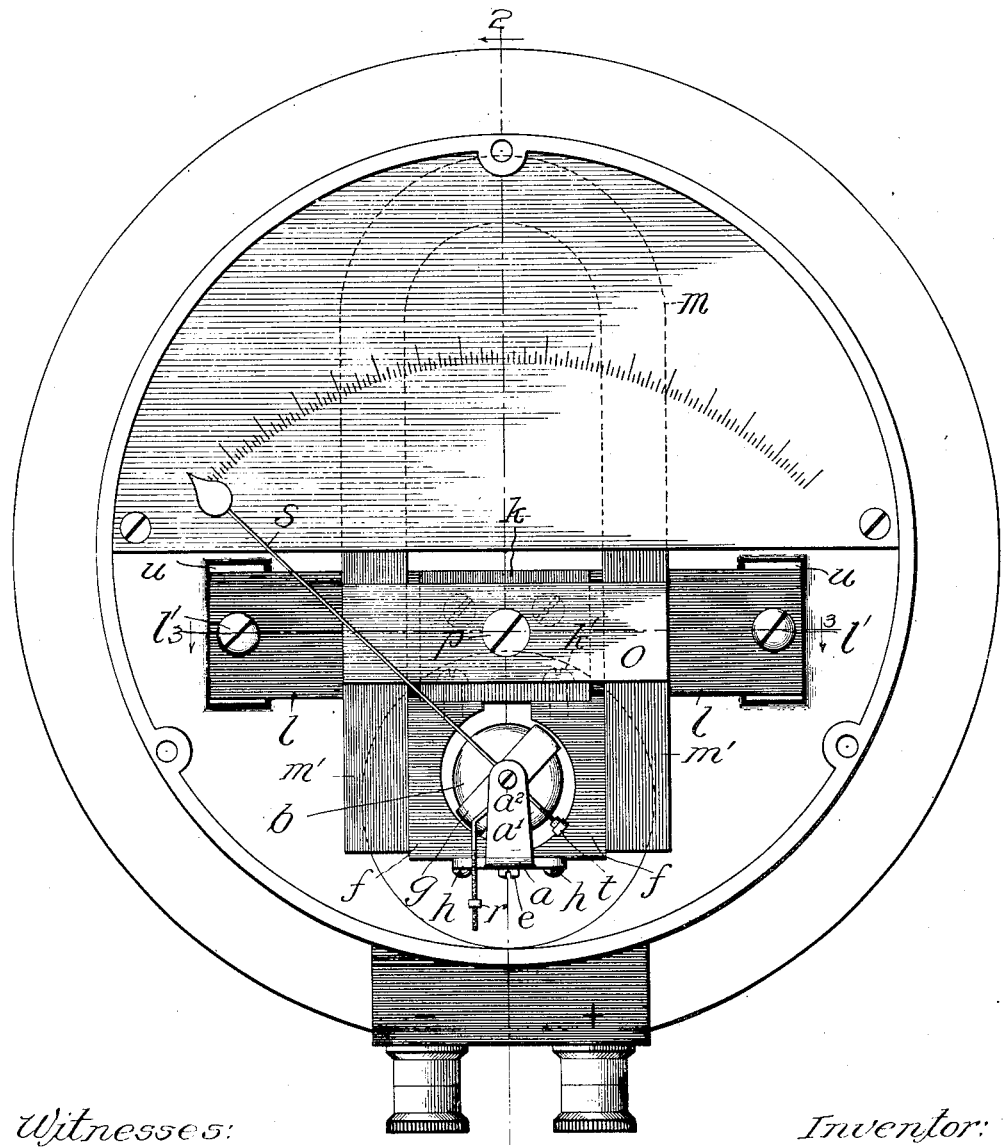

No. 817,843. PATENTED APR. 17, 1906.
J. C. GANO.
ELECTRICAL MEASURING INSTRUMENT.
APPLICATION FILED JULY 24, 1905.

3 SHEETS—SHEET 1.

Witnesses:
Inventor:
John C. Gano,
By Barton & Banner
Att'ys.

No. 817,843. PATENTED APR. 17, 1906.
J. C. GANO.
ELECTRICAL MEASURING INSTRUMENT.
APPLICATION FILED JULY 24, 1905.
3 SHEETS—SHEET 2.
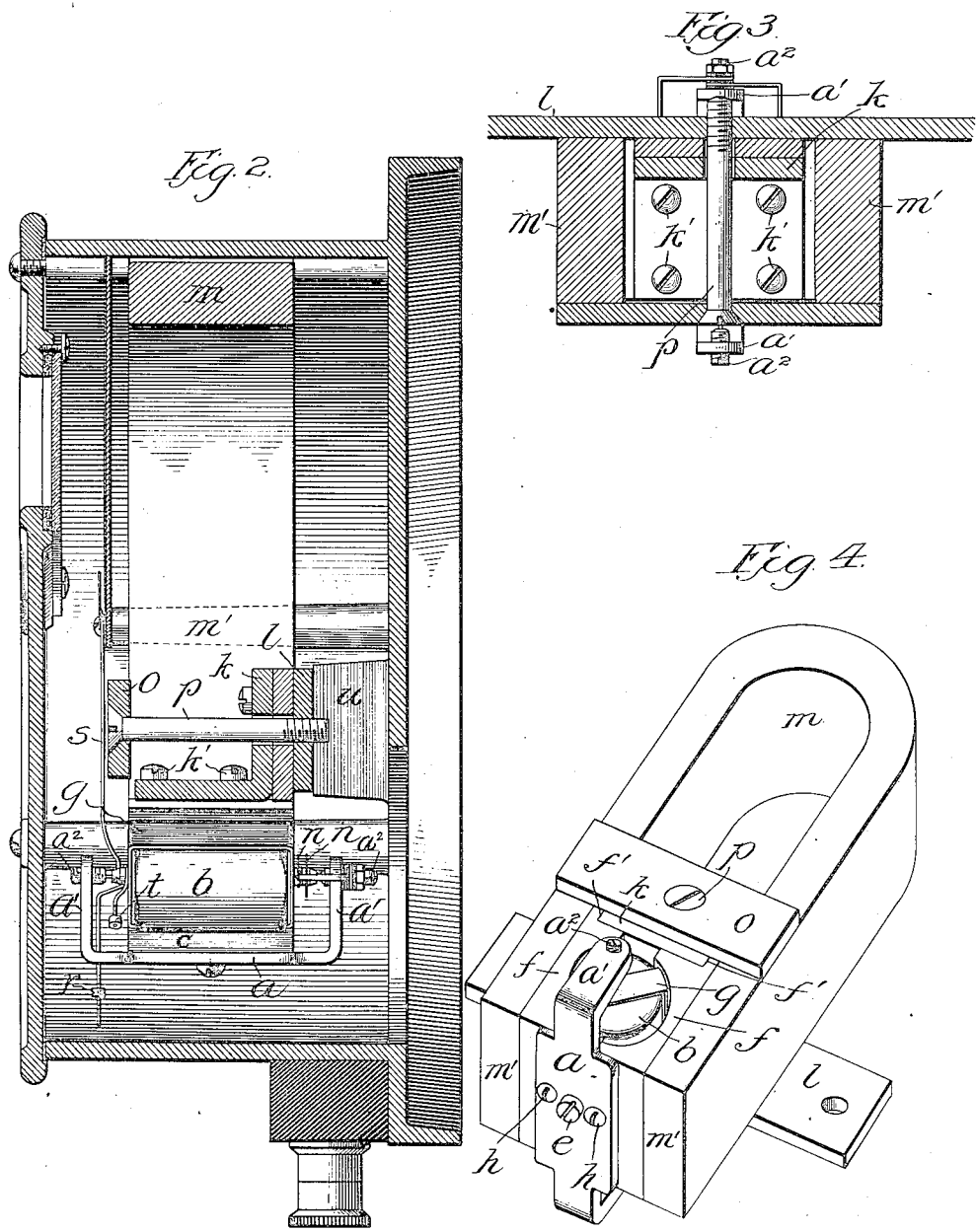
Witnesses:
Inventor:
John C. Gano,
By Barton & Banner
Attys.

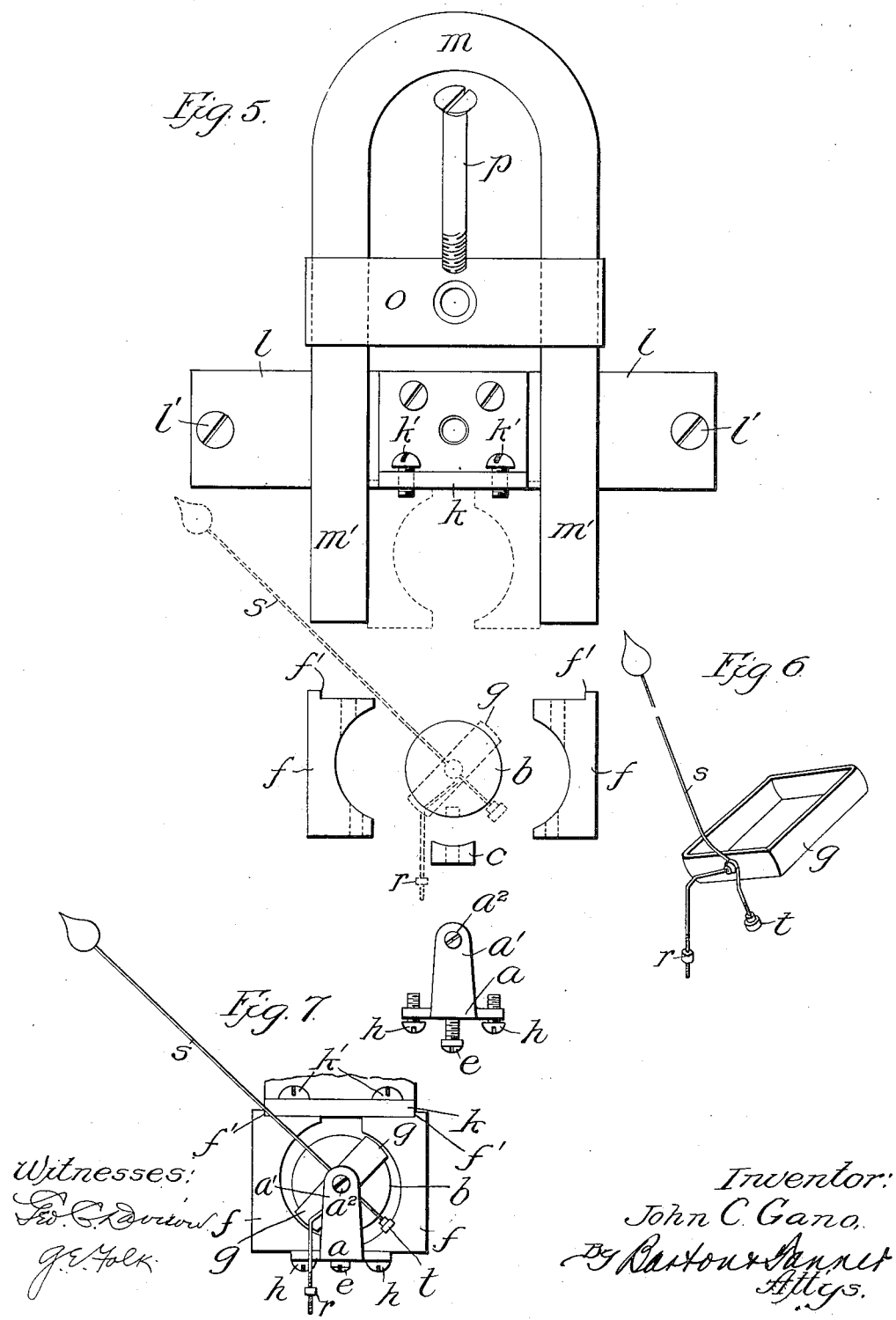

UNITED STATES PATENT OFFICE.

JOHN C. GANO, OF CHICAGO, ILLINOIS, ASSIGNOR TO INTERNATIONAL ELECTRIC METER COMPANY, OF CHICAGO, ILLINOIS, A CORPORATION OF ILLINOIS.

ELECTRICAL MEASURING INSTRUMENT.

No. 817,843.  Specification of Letters Patent.  Patented April 17, 1906.

Application filed July 24, 1905. Serial No. 270,928.

*To all whom it may concern:*

Be it known that I, JOHN C. GANO, a citizen of the United States, residing at Chicago, in the county of Cook and State of Illinois, have invented a certain new and useful Improvement in Electrical Measuring Instruments, of which the following is a full, clear, concise, and exact description.

My invention relates to an electrical measuring instrument of the type in which a coil of wire adapted to carry the current to be measured is arranged to move in the field of force of a horseshoe-magnet; and its object is to provide an improved and simple construction of the framework and magnetic system such that the parts may be easily and quickly made and assembled and will not be liable to get out of adjustment.

My invention will be more readily understood by reference to the accompanying drawings, in which—

Figure 1 is a view of the complete instrument in front elevation, the cover being removed to disclose the mechanism. Fig. 2 is a vertical sectional view thereof on line 2 2 of Fig. 1, the core and coil-frame and their supporting parts, however, being shown in full elevation. Fig. 3 is a detail sectional plan view on line 3 3 of Fig. 1. Fig. 4 is a perspective view of the working parts of the instrument. Fig. 5 is a view showing the several parts of the magnetic system and the support for the moving coil apart from one another to illustrate the detail construction and manner of assembly. Fig. 6 is a detail view of the coil-frame, together with the pointer and counterweights carried thereby. Fig. 7 is a detail view of the movement or operating mechanism apart from the magnet.

The same letters of reference are used to designate the same parts wherever they are shown.

The instrument illustrated in the drawings is of the gravity type, in which the motion of the coil is opposed by a weighted arm, which tends to maintain the coil normally at the zero position. It will be seen that the coil-frame is supported upon pivotal bearings in the arms $a'$ $a'$ of a U-shaped support or yoke-piece $a$. This yoke-piece also carries the central core $b$, of soft iron, which is arranged concentrically with the axis of the coil-frame. A convenient and cheap construction is to punch the yoke-piece $a$ out of sheet metal and turn up the ends to form the bracket-arms $a'$ $a'$, which hold the pivot-screws $a^2$ $a^2$ for the moving coil and to interpose a block or distance-piece $c$ between the core $b$ and the yoke-piece, so that the core will be maintained in proper position. The block $c$, as shown, is provided with a curved face adapted to fit the side of the cylindrical core, and said core and the block are secured together and to the yoke-piece $a$ by means of a screw $e$, passing through all three.

The pole-pieces $ff$ of the magnet are soft-iron blocks which are inwardly curved or concave, as shown, to fit around either side of the core $b$ and establish an approximately annular field of force, in which the coil-frame $g$ is adapted to turn. In the particular instrument illustrated, however, the curvature of the pole-pieces is not exactly concentric with the core; but the faces of said pole-pieces are both eccentric thereto, so as to establish a field of force gradually decreasing in intensity in the direction of movement of the coil as the latter turns under the influence of a current. This eccentric shape of the pole-faces, however, forms no part of this invention. The pole-pieces $ff$ are mounted in fixed relation to the core and moving coil by screws $h\,h$, which pass through the body of the yoke-piece $a$ upwardly into the lower faces of said pole-pieces. Said pole-pieces $ff$ are secured at their upper sides to a bracket $k$, of brass or other non-magnetic material, which is carried by a brass back plate $l$. As shown most clearly in Fig. 5, the upper faces of the pole-pieces $ff$ are provided with shoulders $f'\,f'$, which are adapted to fit the edges of the bracket $k$, so that said pole-pieces can be readily placed in the proper position. Screws $k'$ $k'$, passing through the bracket $k$ into the upper faces of said pole-pieces $ff$, serve to hold them in position. It will be seen that the pole-pieces $ff$, supported by the bracket $k$ and in turn supporting and being supported by the yoke-piece $a$, carrying the core $b$ and the moving coil, form together a unitary structure or "movement" which may be readily assembled apart from the magnet, as shown in Fig. 7. The parts of this movement mutually support each other in the proper relations, as shown in Fig. 7.

The permanent magnet $m$ is provided with parallel arms $m'$ $m'$, between which the movement is adapted to be placed, so that the pole-pieces $ff$ form magnetic extensions of said arms to convey the magnetic flux through the annular field in which the coil moves. The magnet is easily and quickly secured in fixed relation to the pole-pieces $ff$ by being clamped upon the back plate or support $l$. As shown most clearly in Figs. 3 and 5, a brass strap or clamping-bar $o$ passes across the two arms $m'$ $m'$ of the magnet and is provided with a hole through which screw $p$ passes into the body of the frame or back made up of the back plate $l$ and bracket $k$. The magnet is thus securely clamped between said frame or back plate and the bar $o$. It thus becomes an easy matter to fit the movement with a magnet of any required strength, since the removal and replacement of the magnet may be accomplished with the utmost ease, the parallel arms of the magnet slipping over the parallel outer sides of the pole-pieces $ff$. It will further be observed that this construction does not involve drilling holes in the permanent magnet. As is well known, such magnets must be made of very hard steel, and the drilling of holes through the ends thereof in order to fasten the pole-pieces in position, as has been necessary in most structures heretofore, is a tedious, difficult, and expensive operation, which can be entirely avoided by my invention.

In the instrument shown in the drawings the motion of the coil in the magnetic field is opposed by the weight of an arm $r$, which extends downward below the pivot of the coil. The indicating-needle $s$, carried by the coil-frame, may be provided with a counter-weight $t$. The current may be led to and from the moving coil by flexible conductors $n$ $n$, of fine flat copper wire, each conductor being connected at its inner end to an insulated bushing carried by the coil-frame and forming the terminal of the coil and at its outer end to a suitable terminal piece mounted upon one of the brackets $a'$. It should be stated, however, that this invention is not concerned with the particular means for conveying current to and from the coil or with any particular means for opposing the motion of the coil. It is obvious that other constructions—such, for example, as the well-known one involving the use of spiral coiled springs for opposing the motion of the coil and conveying current to and from the coil—may be adopted, while still making use of the novel features of construction described.

It will be noted that all the parts of my instrument are so formed and adapted to each other that they may be very cheaply manufactured and will be readily interchangeable. The assembly of the several parts is accomplished with great ease and may be proceeded with as follows: Taking the yoke-piece $a$ as the starting-point, the core $b$ and block $c$ are placed together and fastened to the yoke-piece or support $a$ by means of the screw $e$. The coil-frame $g$, with the coil, needle, and weight carried thereby, may now be placed over the core $b$ and the coil-frame adjusted in its pivotal mountings, which may consist of screws $a^2$ $a^2$, passing through the brackets $a'$ $a'$ of the yoke-piece. While the coil-frame is thus mounted in its pivotal bearings, it may be easily adjusted as desired to turn with the utmost freedom, and the connections of the flexible conductors $n$ $n$ with the terminals of the coil may conveniently be made at this time. When the coil is properly mounted and satisfactorily adjusted to turn freely around the core $b$, said core, together with the coil-frame and the supporting-yoke $a$, may be placed as a unit between the pole-pieces $ff$, which will then be secured in fixed relations thereto by the screws $h$ $h$, said pole-pieces also being fastened to the supporting-bracket $k$ by the screws $k'$ $k'$. The movement is now ready to be placed between the arms of the permanent magnet $m$, and this may be quickly accomplished by sliding the magnet down until the lower ends of the pole-pieces $ff$ are flush with the magnet-arms. The magnet may now be clamped in position by means of the clamp $o$ and screw $p$, which passes through the same into the supporting-bracket. The working parts of the instrument thus assembled are now ready to be mounted in the case, and this may be accomplished by merely passing screws $l'$ $l'$ through the supporting-plate $l$ into lugs $u$ $u$, formed for that purpose in the case.

It will be seen that the instrument may easily be removed as a unit from the casing for the purpose of adjustment or repairs by merely removing the screws $l'$ $l'$, and the movement may be as quickly detached from the magnet by merely loosening screw $p$ and sliding the movement out from between the arms of said magnet.

Having thus described my invention, I claim as new and desire to secure by Letters Patent the following:

1. In an electrical measuring instrument, the combination with a bracket $k$, of a movement supported by said bracket comprising a pair of pole-pieces $ff$ fixed upon said bracket, a moving coil pivoted to rotate between said pole-pieces, a horseshoe-magnet between the arms of which said pole-pieces are adapted to fit, and a clamp independent of said pole-pieces for holding said magnet and bracket together.

2. In an electrical measuring instrument, the combination with a supporting-plate carrying a bracket, of pole-pieces mounted upon said bracket, said pole-pieces having flat parallel outer sides and concave inner faces, a coil-frame pivoted to rotate between the concave faces of said pole-pieces, a U-shaped yoke in the arms of which the pivotal mountings for said coil are provided, said yoke-piece being fastened to said pole-pieces, a horseshoe-magnet having parallel arms adapted to embrace the parallel outer sides of said pole-pieces, a clamping-bar *o* and a screw *p* passing through said clamping-bar into said bracket, said magnet being clamped thereby between said bar and said back plate, substantially as set forth.

3. The combination with the supporting-bracket *k*, of the pole-pieces *f, f*, having shoulders *f', f'*, adapted to conform to said bracket, means for holding the shouldered portions of said pole-pieces against said bracket, whereby said pole-pieces are quickly adjusted and maintained in proper relative positions, a coil mounted to oscillate between said pole-pieces, a horseshoe-magnet embracing said pole-pieces and a clamp independent of said pole-pieces for holding said magnet and bracket together.

4. In an electrical measuring instrument, a U-shaped magnet and a support therefor, a moving system comprising pole-pieces adapted to fit within the arms of said magnet, and a moving coil mounted to oscillate between said pole-pieces, in combination with a support independent of said magnet, upon which support said pole-pieces are mounted.

In witness whereof I hereunto subscribe my name this 20th day of July, A. D. 1905.

JOHN C. GANO.

Witnesses:
AUGUST BENSON,
DE WITT C. TANNER.